Oct. 29, 1957  T. W. KENYON  2,811,042
STABILIZER FOR SIGHTING DEVICES
Filed April 2, 1954  3 Sheets-Sheet 1
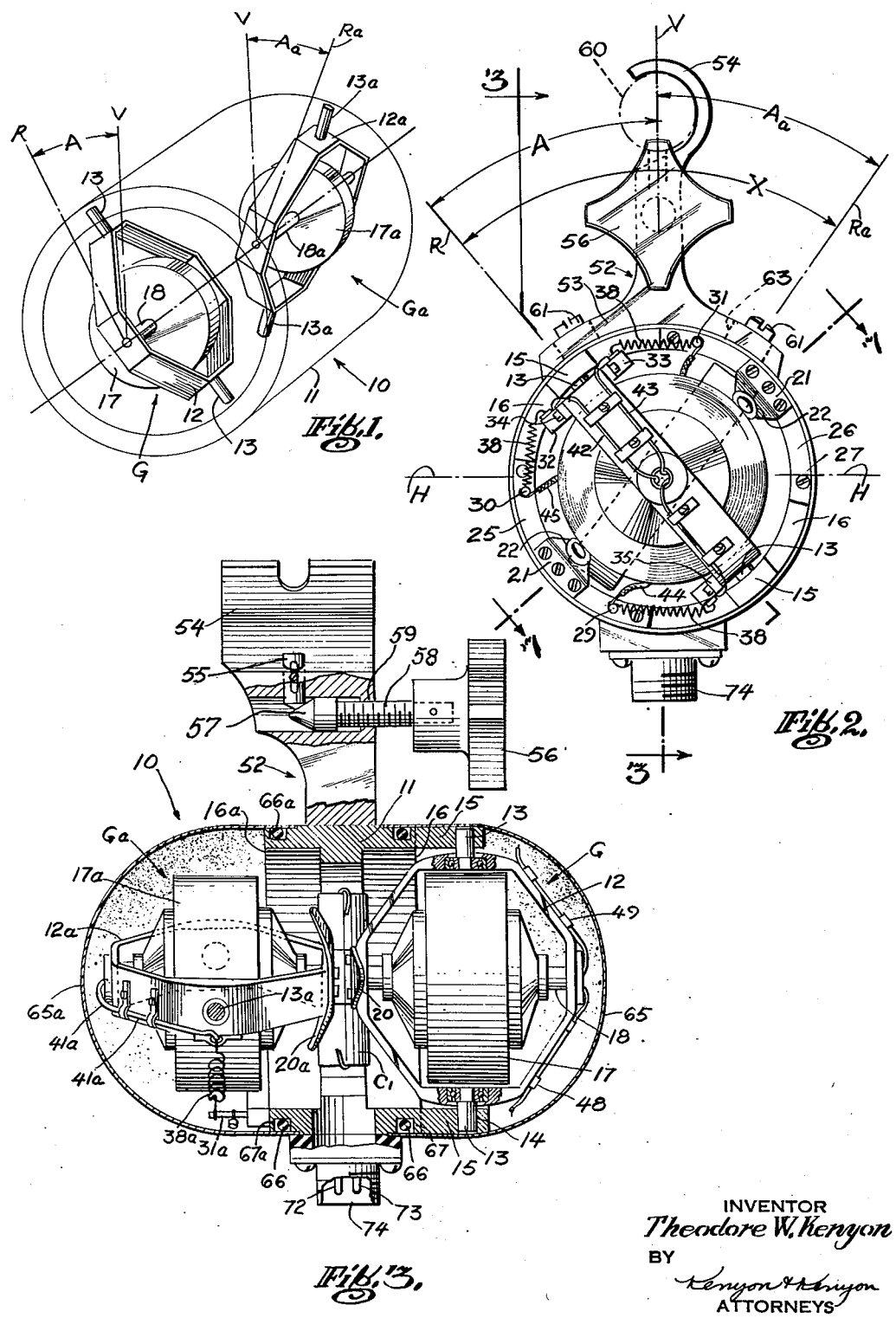
INVENTOR
Theodore W. Kenyon
BY
Kenyon & Kenyon
ATTORNEYS

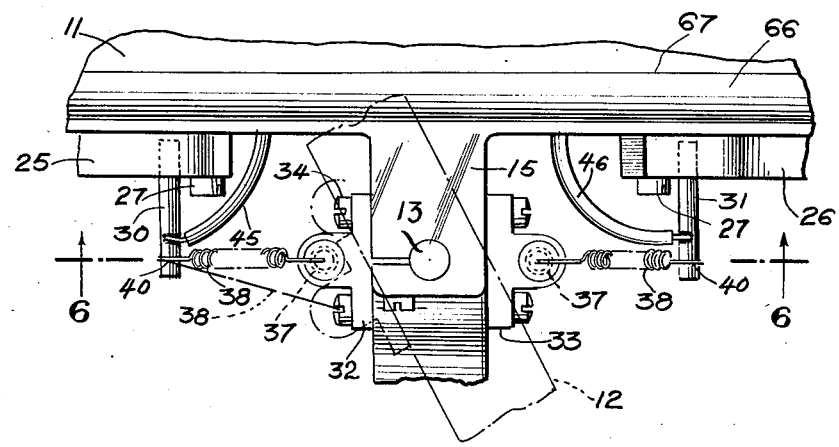
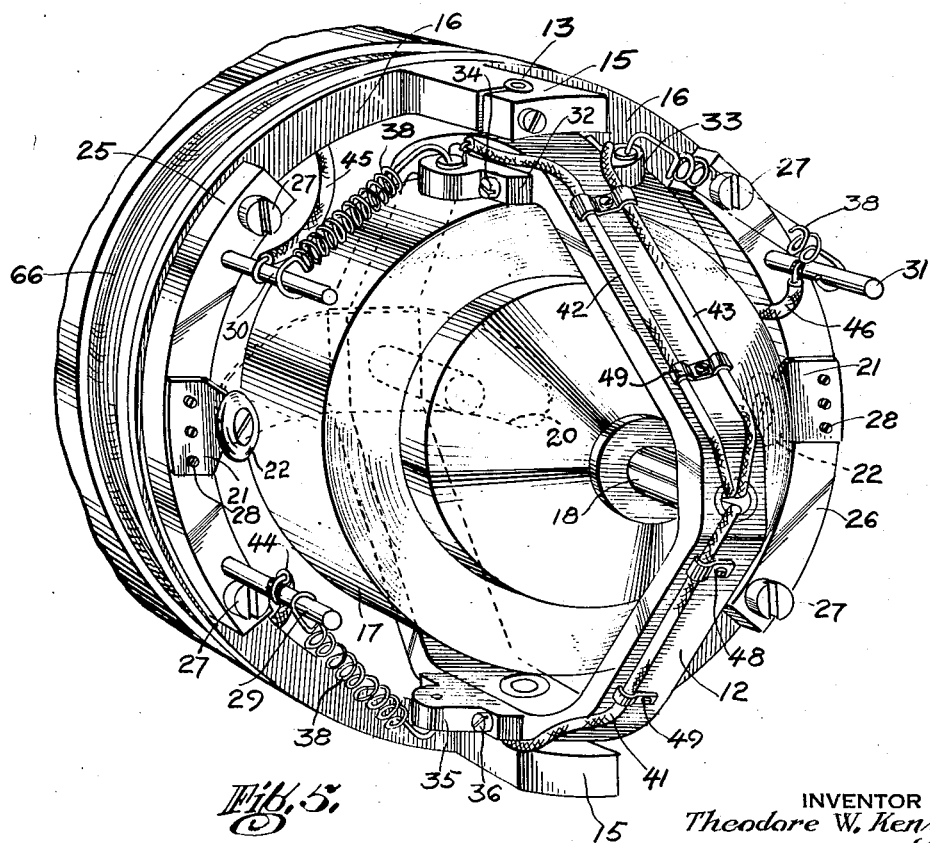

Oct. 29, 1957 T. W. KENYON 2,811,042
STABILIZER FOR SIGHTING DEVICES
Filed April 2, 1954 3 Sheets-Sheet 3
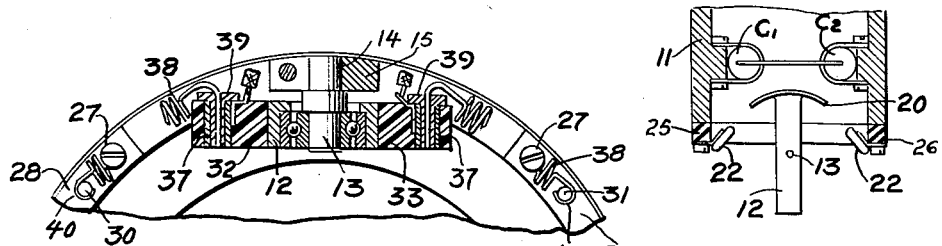
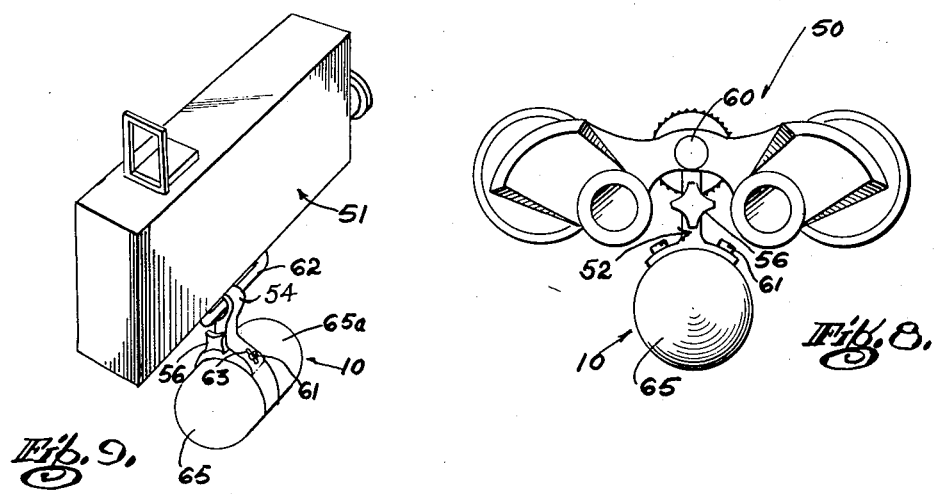
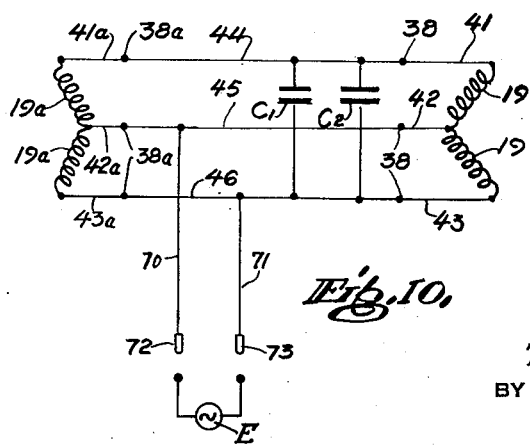
INVENTOR
*Theodore W. Kenyon*
BY
*Kenyon & Kenyon*
ATTORNEYS United States Patent Office 2,811,042
Patented Oct. 29, 1957

2,811,042

STABILIZER FOR SIGHTING DEVICES

Theodore W. Kenyon, Old Lyme, Conn., assignor to Kenyon Laboratories, Incorporated, Old Lyme, Conn., a corporation of Connecticut Application April 2, 1954, Serial No. 420,584

12 Claims. (Cl. 74—5.22)

This invention relates to gyroscopic stabilizing instruments that are intended primarily for use with sighting devices, such as binoculars, cameras or other hand-held devices.

In the use of hand-held sighting devices of the character mentioned, it is usually very difficult to secure sharp images of objects that are under observation or that are to be photographed because of vibration. The vibration may be caused by hand tremors or by movement of the vehicle carrying the observer or may be the result of other causes. Whatever the cause, the vibrations blur the image of the observed object sufficiently to make it hazy or else destroy its clarity completely. When high magnification is present it emphasizes the undesired effects of hand-tremor-caused vibrations or other vibratory motion.

Gyro stabilizers have in the past been utilized in conjunction with sighting devices in an attempt to eliminate the vibration-caused difficulties, but they have not been found to be entirely satisfactory because they attempted to provide equal stabilizing actions on a pair of mutually perpendicular axes.

I have discovered that proper stabilization of hand-held sighting instruments requires more stabilizing action by the gyros in the vertical plane (horizontal axis) than in the horizontal plane (vertical axis). It is particularly advantageous to be able to utilize like gyros for providing the necessary different stabilizing actions on the two axes from the point of view of manufacturing and of servicing problems. The use of like gyros to provide such stabilizing actions requires novel arrangements of their gimbal axes and these novel arrangements are embodied in the instant invention.

Objects and features of this invention are to provide a stabilizing instrument that will provide the required stabilizing actions of different magnitudes and wherein the two gyros are identical in construction and wherein the gyros are so arranged in the instrument relative to each other that they will provide the required greater stabilizing action on the horizontal axis.

Other objects and features of this invention are to provide a simple stabilizing instrument utilizing two gyros of like size and other characteristics to provide the differing stabilizing actions required and which instrument is simple to manufacture and to service because of the identity of its two gyros.

Further objects and features of the invention are the provision of novel spring restraint means in the instrument for damping the gimbals of the two gyros used so that the stabilizing instrument as a whole will be fully responsive even to the smallest of hand-tremor-caused vibrations or other types of small vibrations, thereby enhancing the utility of the instrument in the elimination of haze or blur of any image viewed by a sighting device carrying the stabilizing instrument.

Still other objects and features of the invention are the provision of novel means for utilizing the damping arrangements to provide appropriate lead-in connections for electric current to energize the two gyros.

Still other objects and features of the invention are the provision of spring restraints and novel connections between these restraints and the gimbals of the gyros whereby bending deformation of the spring restraints during large precessional movements of the gimbals is prevented.

Other objects and features of the invention will become apparent from the following specification and drawings, wherein:

Figure 1 is a perspective and partially diagrammatic view of an arrangement of two like gyros as utilized in practicing the invention and showing a crossed angular relationship between the axes of rotation of their gimbals that will provide greater stabilizing action on a horizontal axis than on a vertical axis;

Figure 2 is an end view seen from the right of Figure 3 of a stabilizing instrument embodying the invention and from which a protective cover has been removed to illustrate details of internal construction;

Figure 3 is a longitudinal section of the instrument of Figure 2 taken along line 3—3 of the latter and viewed in the direction of the arrows;

Figure 4 is a fragmentary plan view of parts at one end of the stabilizing instrument;

Figure 5 is a fragmentary perspective view of the instrument as seen from the right side of Figure 3 and from which end a protective cover has been removed and which further for clarity in illustration of internal structural details has been rotated an angular amount sufficient to show the right-hand gimbal axis in a vertical position rather than its usual position in use, which latter is other than vertical or horizontal;

Figure 6 is a fragmentary sectional view taken along line 6—6 of Figure 4 to illustrate structural details and which is viewed in the direction of the arrows;

Figure 7 is a fragmentary sectional view taken along line 7—7 of Figure 2 to illustrate further structural details, and which also is viewed in the direction of the arrows;

Figure 8 is an elevational view of binoculars equipped with the stabilizing instrument of this invention;

Figure 9 is a perspective view of a camera equipped with the stabilizing instrument of this invention; and Figure 10 is a diagrammatic showing of an electric circuit utilized for operating the two gyros of the stabilizing instrument.

Referring to the drawing, the reference character 10 denotes generally a gyro stabilizing instrument embodying the invention. This device includes a tubular casing 11 in which the operating parts, including the two like gyroscopes or gyros G and G$_a$ are carried. These gyros G and G$_a$ are mounted in the casing 11 as will be presently described to provide the required stabilizing actions of different magnitudes relative to horizontal axis H and vertical axis V.

The two gyros G and G$_a$ are identical in construction and size and are supported in separated relationship within said casing 11. Because of their identity the component parts of the gyro G only are described in detail, it being understood that those components of gyro G$_a$ which correspond with like components of gyro G bear similar reference characters in the drawing with the added subscript $a$.

Gyro G comprises a gimbal or gyro frame 12. Oppositely located, axially aligned and ball bearing supported trunnions 13 extend from the gimbal 12. The respective trunnions 13 extend into respective holes 14 of a pair of oppositely located support flanges 15 which are integral with the casing 11. These flanges 15 extend in the longitudinal direction of the casing 11 and from its end edge 16 (see Figs. 2, 3 and 5). The flanges 15 support the trunnions 13 so that the gimbal axis of rotation R of gimbal 12 makes an angle A counterclockwise with respect to the vertical axis V as seen in Figures 1 and 2, The like trunnions 13a of the gimbal 12a of the second gyro Ga are similarly supported in like flanges (not shown) extending longitudinally from the other end edge 16a of casing 11. The latter flanges are so disposed on said end edge 16a that the gimbal axis of rotation Ra of gimbal 12a makes an angle Aa clockwise with respect to the vertical axis V as seen in Figures 1 and 2.

The two gimbal axes R and Ra are in crossed relationship to each other. The crossing angle or angle of intersection X between the two gimbal axes R and Ra is the sum of the two angles A and Aa. This angle X is other than 90° and preferably is approximately 75°. It may range from 5° to 80°. As can be readily seen from Figures 1 and 2, the gimbal axes R and Ra are both disposed other than horizontally or vertically and neither lies in coincidence with either the horizontal or vertical axes of stabilization H or V. When the angle X of intersection between said two gimbal axes R and Ra is other than 90° and in fact approximately 75° as shown herein, greater stability is effected by the two gyros G and Ga around the horizontal axis of stabilization H. By changing angle X to selected other values other than 90° other selected relative differences in stabilizing actions along the horizontal and vertical axes of stabilization H and V may be effected with the two identical gyros G and Ga.

A gyro rotor 17 is supported for rotation on a hollow axle 18 carried by the gimbal 12 of gyro G. This axle 18 is arranged perpendicularly to the gimbal axis R. The field coils or windings 19 (Fig. 10) for driving the rotor 17 are arranged internally thereof and are not shown in detail as such arrangement is conventional.

The gyro rotor 17a of gyro Ga is similarly supported by hollow axle 18a by the gimbal 12a and its field coils or windings 19a are similarly disposed internally of rotor 17a. The axle 18a is perpendicular to the gimbal axis Ra (see Fig. 1).

A bumper 20 (Figs. 3 and 7) is secured to gimbal 12. This bumper has oppositely directed wings which are adapted to engage fixed stop members 21 (Figs. 2 and 5) that are supported from the casing 11 as will be presently described. These stop members 21 in the embodiment shown are each provided with a shock absorber in the form of a rubber ring 22 (see Figs. 2, 5 and 7). The bumper 20 in cooperation with rubber ring carrying stop members 21 limits precessional rotation of gimbal 12 in either direction about its gimbal axis R. Bumper 20a in cooperation with similar rubber ring carrying stop members provides similar limitation of precessional rotation in either direction of the gimbal 12a about its gimbal axis Ra (see Fig. 3).

A pair of like spaced-apart arcuately shaped blocks 25 and 26 of insulative material (Figs. 2 and 5) are supported on the end 16 of casing 11 as by the bolts 27. Preferably the blocks 25 and 26 are symmetrically arranged on to the circumferential surface of said end 16 at oppositely located points. One of the stop members 21 is secured to each of these blocks 25 and 26 as by bolts 28 so that shock absorbing rings 22 carried by the respective stop members 21 extend internally of casing 11 in the path of travel of the bumper 20 of gimbal 12 (see Fig. 7) to limit precessional rotation of the latter in either direction about its axis R as hereinabove described.

Two electrically conductive metal posts 29 and 30 extend outwardly from one of the arcuately shaped blocks 25 and a similar post 31 extends outwardly from the other arcuately shaped block 25. The posts 29, 30 and 31 all extend parallelly with the longitudinal axis of casing 11.

Blocks 32 and 33 of insulative material are secured respectively to opposite side faces of the gimbal 12 adjacent one of its trunnions 13 as by bolts 34. A similar block 35 of insulating material is secured similarly by bolts 36 to one side face of gimbal 12 adjacent its other trunnion 13 (see Fig. 5).

A hollow bushing 37 (see Fig. 6) of conductive material such as bronze is mounted in each of the blocks 32, 33 and 35, for purposes presently to be described.

Restraining means or spring restraints for the gimbal 12 in the form of electrically conductive light springs 38 are provided. Each spring has a terminal plug 39 of conductive material secured to one end as by soldering or welding. Each plug 39 is shaped to fit rotatively in a hollow bushing 37. A hook 40 is provided at the opposite end of each spring 38. One of the springs 38 is mounted under tension between each of the blocks 32, 33 and 35 and one of the posts 29, 30 and 31 by engaging its hook 40 about a particular post and inserting its plug 39 into the bushing 37 of a particular one of the blocks 32, 33 or 35. The three springs 38 thus act as spring restraints or damping means for the gimbal 12 tending normally to bias it lightly toward its normal undeflected position which is that wherein the central plane of the gimbal 12 is parallel with the longitudinal axis of the casing 11. These springs 38 are very light and do not, therefore, interfere with precessional rotation or swing of the gimbal 12 about its gimbal axis R. Since the plugs 39 fit rotatively into the bushings 37 and the springs 38 are light, the damping action on precessional movements of the gimbal 12 is slight. Thus, the slight damping of the gimbal provided by the springs 38 does not prevent the gimbal 12 from changing position slightly (precessing slightly) even when extremely small precessional forces are exerted on the gimbal. If the damping springs 38 were directly connected to the gimbal 12 instead of through plugs 39 in bushings 37, the gimbal 12 would not respond to such forces as very small hand tremors and the sensitivity and hence utility of the instrument would be reduced greatly.

In addition, the rotative or pivotal, or swivelling relationship between the plugs 39 and bushings 37 prevents the springs 38 from becoming overstressed due to sharp bending when large angular swings, deflections or precessional movements of the gimbal 12 occur. This is seen clearly in Figure 4. With a large deflection of gimbal 12 to the dot dash position, the plug 37 swivels in its bushing 37 and the spring 38 stretches but does not bend along its axis.

Similar biasing or restraining springs 38a are provided for the gimbal 12a. These springs are spanned between rods like rods 29, 30 and 31 extending from insulative arcuately shaped blocks like blocks 25 and 26 secured to the end 16a of casing 11, and bushing-provided, gimbal-supported blocks like blocks 32, 33 and 35 carried by the gimbal 12a. Only one of these springs 38a is shown (see Fig. 3), it being understood that two other springs 38a are arranged in the same way as corresponding springs 38 of Figure 5.

The springs 38 provide convenient means for leading current to the field windings 19 of the gyro G as respective bushings 37 may be connected to lead-in wires 41, 42 or 43 which lead to the terminals of windings 19 through hollow shaft 18. Wires 44, 45 and 46 are connected to respective rods 29, 30 and 31 and to corresponding rods of the second gyro Ga. The springs 38 spanning respective rods and bushings complete electrical connections between the respective wires 41, 42 or 43 and respective wires 44, 45 or 46. The coil connected wires 41, 42 and 43 are secured by clamps 48 and 49 on the gimbal 12 and extend through hollow axle 18 to reach the field windings 19. The conducting springs 38 which may swivel relative to the bushings 35 complete the connections between wires 41, 42 and 43 and respective wires 44, 45 and 46, and are not likely to break and cause circuit failures which might occur if direct splicing were provided between said wires.

The springs 38a provide similar connections to correspinding wires 41a, 42a and 43a that supply current to the field windings 19a of the gyro Ga.

Any suitable arrangement may be provided for suspending the instrument from a sighting device such as binoculars 50 (Fig. 8) or a camera 51 (Fig. 9). This suspending means in the embodiment shown comprises a supporting bracket 52 whose base 53 is secured adjustably to the external surface of casing 11. A fixed clamping jaw 54 which is generally hook-like in shape is provided at the upper end of bracket 52. A clamping pin 55 is carried slidably by a portion of the bracket 52 for cooperation with jaw 54. The pin 55 is movable into tightening relationship with respect to the fixed jaw 54 along a diametrical line as by rotation of a tightening knob 56. This rotation serves to shift longitudinally a cam 57 carried on a threaded shaft 58 that extends through a threaded opening 59 in a portion of the bracket 52. Rotation of the knob 56 in one direction advances the cam 57 toward pin 55 and serves to move the pin 55 toward the inner curved face of fixed jaw 54 for clamping action. Opposite rotation of the knob 56 retracts cam 57 from pin 55 and permits reverse loosening movement of pin 55. The jaw 54 has its curved face so arranged on the supporting bracket 52 that when it is clamped to a part of a sighting device, as will be presently described, the longitudinal axis of the casing 11 of the stabilizing instrument 10 is substantially parallel with the line of sight of the sighting device 50 or 51. The hook-like curvature of jaw 54 causes it to overhang the part of the sighting device to which it is clamped sufficiently to avoid unintentional separation of the instrument from the sighting device if pin 55 is accidentally loosened.

In the case of binoculars 50 the jaw 54 and pin 55 are conveniently clamped to a portion of its usual center rod 60. In the case of a camera 51, the jaw 54 and pin 55 may be clamped to a suspension rod 62 conveniently mounted on the base of the camera 50 and which extends in parallelism with the sighting axis of the camera.

The bracket 52 is angularly adjustable clockwise or counterclockwise on the surface of the casing 11 for purposes presently to be described. To permit such angular adjustment, the securing bolts 61 that serve to fasten the base 53 of bracket 52 to said casing 11 extend through slots 63 provided in the base 53. The lengths of said slots 63 control the range of said angular adjustment possible for said bracket 52 on said casing 11.

Normally the upright portion of the bracket 52 is parallel with the vertical axis V but it may be adjusted angularly clockwise or counterclockwise relative to said axis V by loosening of bolts 61 and retightening the latter after angular adjustment has been made to limits permitted by the slots 63.

Protective end covers 65 and 65a are fitted over the opposite ends 16 and 16a of the casing 11. O-ring sealing members 66 and 66a provided in annular grooves 67 and 67a on the surface of casing 11 effectively seal the casing carried gyro components described against damage due to the atmospheric environment in which the instrument is used.

As seen clearly in Fig. 10, the field windings 19 and 19a of the two gyros G and Ga are connected in electrical parallel by the three interconnecting wires 44, 45 and 46. The condensers $C_1$ and $C_2$ are connected across the wires 44 and 46. Input wires 70 and 71 are connected to the wires 45 and 46 and to terminal prongs 72 and 73 (Fig. 3) conveniently supported in a socket 74 carried by the casing 11. The two prongs 72 and 73 are readily connectable in conventional way to a suitable source E of electric power, in this embodiment 115 volt, 400 cycle alternating current. Power of other frequency and voltage may be supplied depending upon the ratings of the motors of the two gyros G and Ga. Other known ways of driving the rotors 17 and 17a may be used if desired. The condensers $C_1$ and $C_2$ are conveniently carried in any desired way within the casing 11 (see Fig. 7).

Operation of the stabilizing instrument 10 when attached either to the binoculars 50 or camera 51 on its suspension from either by its bracket 52 so that the casing 11 of the instrument lies parallel substantially with the sighting line or axis of either is substantially the same. With the bracket suspension described, the gimbal axes R and Ra are in crossed relationship with each other, their crossing angle X being other than 90° and preferably approximately 75°. Both gimbal axes R and Ra then are at angles which are other than horizontal or vertical, i. e. neither is parallel with the vertical axis V nor the horizontal axis H about which latter two axes stabilization is to be effected.

When power is supplied to rotate the rotors 17 and 17a of the two gyros, both because of the angular disposition of their gimbal axes R and Ra to both the horizontal and vertical axes of stabilization H and V, contribute stabilizing actions to each of said axes of stabilization. Moreover, because the crossing angle X between the gimbal axes R and Ra in this embodiment is approximately 75°, the sum of the components of stabilizing actions contributed by the two gyros G and Ga relative to the horizontal axis H is greater than the sum of the components of stabilizing actions contributed by the two gyros G and Ga relative to the vertical axis V. Since as pointed out hereinabove this type of stabilization is the proper one for effective stabilizing of the sighting instrument against hand tremors or other vibrations, the binoculars 50 or camera 51 tend to remain steady on the line of sight from the eye to the object and resist positional change tendencies caused by such tremors, vibrations or other unsteadiness. The object viewed or photographed, therefore, is sharp and is neither blurred nor hazy.

While the crossing angle X between gimbal axes R and Ra is preferably 75° distributed symmetrically clockwise and counterclockwise relative to the vertical axis V, this angle may be varied from values of approximately 5° to approximately 80°. Likewise the symmetry of distribution of gimbal axes crossing angle X relative to vertical axis V may be changed by an angular shift of the support bracket 52 on the circumference of the casing 11. The extent of such shift should not exceed the maximum value of the crossing angle X between the gimbal axes R and Ra. With such variations both in the crossing angle X and in the angular shift of bracket 52, other different stabilizing actions by the two gyros G and Ga relative to the horizontal and vertical axes H and V may be achieved even though both gyros are identical in size and construction. The preferred arrangement, however, is that shown wherein the crossing angle X between the gimbal axes is approximately 75° and wherein the upright portion of bracket 52 extends parallel with the vertical axis V so that the gimbal axes R and Ra make symmetrical angles A and Aa, respectively, with said vertical axis V, each equal to one-half of the angle X.

The pivotal connection of the springs 38 with the gimbal-carried bushings 37 through the agency of plugs 39 and the similar pivotal connections of springs 38a provide full sensitivity of the gimbals 12 and 12a to even the slightest precessional forces. These pivotal connections also prevent bending distortions of the springs 38 and 38a during large precessional movements of the gimbals 12 and 12a. The pivotal connections also provide convenient means for leading electric current to the windings 19 or 19a of the two gyros via the springs 38 and 38a.

While a specific embodiment of the invention has been disclosed, variations in structural detail within the scope of the appended claims is possible and is contemplated. There is no intention, therefore, of limitation to the exact details shown and described.

What is claimed is:

1. Apparatus of the character described comprising a pair of like gyroscopic devices each having a gimbal axis, said devices being positioned relative to each other so that their gimbal axes are in crossed relationship, said gimbal axes both being disposed other than horizontally or vertically and having a crossing angle between them that is other than 90°.

2. Apparatus of the character described comprising a pair of like gyroscopic devices each having a gimbal axis, said devices being positioned relative to each other so that their gimbal axes are in crossed relationship, said gimbal axes both being disposed other than horizontally or vertically and having a crossing angle between them that is approximately 75°.

3. Apparatus of the character described comprising a casing, a pair of like gyroscopes each having a gimbal axis and means for mounting said gyroscopes in said casing with their gimbal axes in crossed relationship and with both said gimbal axes disposed other than horizontally or vertically, said axes having a crossing angle between them that is other than 90°.

4. Apparatus of the character described comprising a casing, a pair of like electrically driven gyroscopes each including a gimbal, means for supporting the gimbals within said casing for rotation on respective gimbal axes that are both disposed other than vertically or horizontally and that are in crossed relationship relative to each other, and so that they have a crossing angle between them that is other than 90°, means for suspending said casing from a sighting device, spring restraining means for each gimbal and means for supplying electric current to drive said gyroscopes through said spring restraining means.

5. Apparatus of the character described comprising a pair of like electrically driven gyroscopes each including a gimbal and an electrically driven rotor carried by its gimbal, electrically conductive restraining springs for each gimbal, conductive bushings carried by each gimbal, and an electrically conductive plug member secured to each spring and being removably insertable into one of said conductive bushings and also being rotatable therein, whereby said springs may swivel freely relative to the gimbals during precessional movements of the latter, said springs, bushings and plug members also serving as electrical connecting elements for supplying electric driving power to said gyroscopes.

6. Apparatus of the character described comprising a casing, a pair of like gyroscopes each comprising a gimbal and a gyro rotor, means for supporting the gimbals from said casing so that the axes of the gimbals are in crossed relationship and the disposition of both axes is other than horizontal or vertical, said axes having a crossing angle between them that is other than 90°, and means for suspending said casing from a sighting device to maintain said disposition of said axes.

7. Apparatus of the character described comprising a casing, a pair of like gyroscopes each comprising a gimbal and a gyro rotor, means for supporting the gimbals of the gyroscopes from said casing so that the axes of the gimbals are in crossed relationship relative to each other and the disposition of both axes is other than horizontal or vertical, said axes having a crossing angle between them that is other than 90°, and angularly adjustable means for suspending said casing from a sighting device to maintain said disposition of said axes.

8. Apparatus of the character described comprising a casing, a pair of like gyroscopes each comprising a gimbal and a gyro rotor, means for supporting the gimbals from said casing so that the axes of the gimbals are in crossed relationship and the disposition of both axes is other than horizontal or vertical, said axes having a crossing angle between them that is other than 90°, means for suspending said casing from a sighting device to maintain said disposition of said axes, spring restraint means for each gimbal, and pivotal connections between the spring restraint means and the gimbals to prevent bending deformation of the spring restraint means during large precessional movements of the gimbals.

9. Apparatus of the character described comprising a gyroscopic device adapted to provide stabilizing action of determined magnitude about a first axis, a second like gyroscopic device adapted to provide stabilizing action of different determined magnitude about a second axis, said two gyroscopic devices being disposed for operation about axes other than horizontal or vertical and being angularly separated from each other by a determined angle.

10. Apparatus of the character described comprising a tubular casing, means for mounting said casing with its longitudinal axis substantially parallel to a sight line of a sighting device, a gyro gimbal within said casing, means for supporting said gimbal within said casing for rotation about an axis whose disposition is other than horizontal or vertical, a gyro rotor rotatively supported by said gimbal, a second gyro gimbal within said casing, means for supporting said second gimbal within said casing for rotation about an axis whose disposition is also other than horizontal or vertical, said two axes having determined angular separation other than 90° relative to each other, and a gyro rotor rotatively supported by said second gimbal.

11. Apparatus of the character described comprising a gyroscopic device including a gimbal mounted for rotation about an axis that is disposed other than horizontally or vertically and a second gyroscopic device including a gimbal mounted for rotation about a second axis arranged in crossed relationship relative to the first named axis and which second axis is also disposed other than horizontally or vertically, the crossing angle between said two axes being approximately 75°.

12. Apparatus of the character described comprising a gyroscopic device including a gimbal therefor mounted for rotation about an axis that is disposed other than horizontally or vertically and a second gyroscopic device including a gimbal mounted for rotation about a second axis that is in crossed relationship relative to said first named axis and which second axis is also disposed other than horizontally or vertically, the angular separation of the two axes relative to each other being other than 90°, spring restraint means for each gimbal, and means for preventing deformation of said spring restraint means during large precessional movements of the gimbals.

References Cited in the file of this patent

UNITED STATES PATENTS

| | | |
|---|---|---|
| 1,645,079 | Titterington | Oct. 11, 1927 |
| 2,209,735 | Lauck | July 30, 1940 |
| 2,432,430 | Luboshez | Dec. 9, 1947 |
| 2,570,130 | Kenyon | Oct. 2, 1951 |

FOREIGN PATENTS

| | | |
|---|---|---|
| 589,216 | France | Feb. 18, 1925 |